(12) United States Patent
Ishii et al.

(10) Patent No.: US 11,212,231 B2
(45) Date of Patent: Dec. 28, 2021

(54) DATA PROCESSING SYSTEM AND METHOD OF CONTROLLING THE SAME

(71) Applicant: Hitachi, Ltd., Tokyo (JP)

(72) Inventors: Daisuke Ishii, Tokyo (JP); Takumi Oishi, Tokyo (JP); Yuji Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 16/331,552

(22) PCT Filed: Mar. 28, 2017

(86) PCT No.: PCT/JP2017/012703
§ 371 (c)(1),
(2) Date: Mar. 8, 2019

(87) PCT Pub. No.: WO2018/179103
PCT Pub. Date: Oct. 4, 2018

(65) Prior Publication Data
US 2021/0288911 A1 Sep. 16, 2021

(51) Int. Cl.
*H04L 12/851* (2013.01)
*H04L 12/813* (2013.01)
(Continued)

(52) U.S. Cl.
CPC .......... *H04L 47/2441* (2013.01); *H04L 12/66* (2013.01); *H04L 47/20* (2013.01); *H04L 47/2483* (2013.01); *H04L 67/12* (2013.01)

(58) Field of Classification Search
CPC combination set(s) only.
See application file for complete search history.

(56) References Cited

U.S. PATENT DOCUMENTS

| 9,733,973 | B2* | 8/2017 | Prasad | H04L 43/12 |
| 9,961,096 | B1* | 5/2018 | Pierce | H04L 63/1425 |

(Continued)

FOREIGN PATENT DOCUMENTS

| JP | 2004-5309 A | 1/2004 |
| JP | 2008-507014 A | 3/2008 |
| JP | 2015-11716 A | 1/2015 |

OTHER PUBLICATIONS

International Search Report (PCT/ISA/210) issued in PCT Application No. PCT/JP2017/012703 dated Jun. 20, 2017 with English translation (four (4) pages).

(Continued)

*Primary Examiner* — Yee F Lam
(74) *Attorney, Agent, or Firm* — Crowell & Moring LLP

(57) ABSTRACT

Provided is a data processing system which links a plurality of types of processing each of which configured to implement a function. The data processing system includes: a gateway for inputting data; and a server for inputting data output from the gateway. The gateway applies first processing including one or more types of processing to the input data in accordance with information included in first flow information and outputs the processed data to the server. The server applies second processing to the data input from the gateway in accordance with the information included in the first flow information and thereafter applies third processing including one or more types of processing, specifies the second processing, generates, from the first flow information, second flow information including information for applying the third processing to the data input by the server from the gateway, and generates, from the first flow information, the second flow information including information for applying the first processing to the data input by the gateway and thereafter applying the second processing.

8 Claims, 13 Drawing Sheets

| GATEWAY CPU LOAD TABLE 16-1 | | |
|---|---|---|
| GATEWAY ID 161-1 | CPU LOAD 162-1 | GATEWAY/SERVER PERFORMANCE RATIO 163-1 |
| G1 | 90% | 0.5 |
| G2 | 50% | 0.5 |
| G3 | 30% | 0.75 |

| GATEWAY CPU LOAD TABLE 16-2 | | |
|---|---|---|
| GATEWAY ID 161-2 | CPU LOAD 162-2 | GATEWAY/SERVER PERFORMANCE RATIO 163-2 |
| G1 | 90% | 0.5 |
| G2 | 60% (10% INCREASE) | 0.5 |
| G3 | 30% (7% INCREASE) | 0.75 |

(51) Int. Cl.
*H04L 12/66* (2006.01)
*H04L 29/08* (2006.01)

(56) References Cited

U.S. PATENT DOCUMENTS

| | | | | |
|---|---|---|---|---|
| 10,693,749 | B2* | 6/2020 | Prasad | G06F 16/29 |
| 2003/0004688 | A1* | 1/2003 | Gupta | H04L 63/1416 |
| | | | | 702/188 |
| 2004/0064832 | A1 | 4/2004 | Tsukidate et al. | |
| 2006/0015849 | A1 | 1/2006 | Polozoff | |
| 2008/0284748 | A1* | 11/2008 | Hsu | G06F 3/0487 |
| | | | | 345/173 |
| 2011/0191011 | A1* | 8/2011 | McBride | H04W 28/06 |
| | | | | 701/117 |
| 2012/0188940 | A1* | 7/2012 | Agrawal | H04W 64/00 |
| | | | | 370/328 |
| 2015/0007185 | A1 | 1/2015 | Dey et al. | |
| 2016/0006837 | A1* | 1/2016 | Reynolds | H04L 41/0853 |
| | | | | 709/203 |
| 2016/0042283 | A1* | 2/2016 | Kelly | G06N 5/043 |
| | | | | 706/12 |
| 2016/0078731 | A1* | 3/2016 | Kelly | G08B 13/19 |
| | | | | 340/691.1 |
| 2016/0135109 | A1* | 5/2016 | Hampel | H04W 4/70 |
| | | | | 370/315 |
| 2016/0135242 | A1* | 5/2016 | Hampel | H04W 76/14 |
| | | | | 370/329 |
| 2016/0195864 | A1* | 7/2016 | Kim | G05B 15/02 |
| | | | | 709/221 |
| 2016/0218951 | A1* | 7/2016 | Vasseur | H04L 43/022 |
| 2016/0335865 | A1* | 11/2016 | Sayavong | G06F 16/951 |
| 2016/0357546 | A1* | 12/2016 | Chang | G06F 21/57 |
| 2016/0359628 | A1* | 12/2016 | Singh | G06F 21/552 |
| 2016/0359872 | A1* | 12/2016 | Yadav | H04L 43/0894 |
| 2017/0013658 | A1* | 1/2017 | Ta | H04L 45/04 |
| 2018/0295101 | A1* | 10/2018 | Gehrmann | H04L 63/1458 |

OTHER PUBLICATIONS

Japanese-language Written Opinion (PCT/ISA/237) issued in PCT Application No. PCT/JP2017/012703 dated Jun. 20, 2017 (four (4) pages).

Kubota M. et al., "Dynamic Resource Controller Technology to Accelerate Processing and Utilization of IoT Data", Fujitsu, Mar. 1, 2016, pp. 42-51, vol. 67, Issue No. 2, with English abstract (13 pages).

Nakamichi O., "Edge Computing no Hakairyoku Dai 2 Bu: Gijutsu Doko System no Kanrisei Kojo to Shodenryoku. Koseinoka ga Juyo ni", Nikkei Electronics, Oct. 20, 2015, pp. 52-57, Issue No. 1161 (8 pages).

* cited by examiner

FIG. 2

DATA PROCESSING FUNCTION MANAGEMENT TABLE

| DATA PROCESSING FUNCTION ID | PROCESSING TYPE | ON-GATEWAY EXECUTABILITY |
|---|---|---|
| F1 | DATA FORMAT CONVERSION (BINARY TO JSON) | ENABLED |
| F2 | THRESHOLD DETERMINATION | ENABLED |
| F3 | FAST FOURIER TRANSFORM | ENABLED |
| F4 | MAXIMUM VALUE CALCULATION | ENABLED |
| F5 | INDEX DATA ASSIGNMENT | ENABLED |
| F6 | COMPARISON OF PLURALITY OF SENSORS | DISABLED |
| ⋮ | ⋮ | ⋮ |

FIG. 3A

GATEWAY FUNCTION ALLOCATION INFORMATION TABLE

| GATEWAY ID | ALLOCATION FUNCTION ID LIST |
|---|---|
| G1 | F1 |
| G2 | F1 |
| G3 | F1 |

FIG. 3B

GATEWAY FUNCTION ALLOCATION INFORMATION TABLE (12-2)

| GATEWAY ID (121-2) | ALLOCATION FUNCTION ID LIST (122-2) |
|---|---|
| G1 | F1 |
| G2 | F1, F4 |
| G3 | F1, F4 |

FIG. 4A

Flow DEFINITION TABLE (13-1)

| ALLOCATION POSITION (131-1) | Flow ID (132-1) | PROCESS LIST (133-1) | |
|---|---|---|---|
| | | ORDER 1 | ORDER 2 |
| Serv | 101 | F2-1 | F3-1 |
| Serv | 102 | F4-1 | F5-1 |
| G1 | 301 | F1-1 | |
| G2 | 401 | F1-2 | |
| G3 | 501 | F1-3 | |

FIG. 4B

Flow DEFINITION TABLE 13-2

| ALLOCATION POSITION (131-2) | Flow ID (132-2) | PROCESS LIST (133-2) | |
|---|---|---|---|
| | | ORDER 1 | ORDER 2 |
| Serv | 101 | F2-1 | F3-1 |
| Serv | 102 | F4-1 | F5-1 |
| Serv | 201 | F5-2 | |
| G1 | 301 | F1-1 | |
| G2 | 401 | F1-2 | |
| G2 | 402 | F1-4 | F4-2 |
| G3 | 501 | F1-3 | |
| G3 | 502 | F1-5 | F4-3 |

FIG. 5A

INTRA-GATEWAY ROUTING TABLE 14-1

| GATEWAY ID (141-1) | SENSOR ID (142-1) | Flow ID (143-1) |
|---|---|---|
| G1 | A11 | 301 |
| G1 | B12 | 301 |
| G2 | A21 | 401 |
| G2 | B22 | 401 |
| G3 | A31 | 501 |
| G3 | B32 | 501 |

| INTRA-GATEWAY ROUTING TABLE | | |
|---|---|---|
| GATEWAY ID (141-2) | SENSOR ID (142-2) | Flow ID (143-2) |
| G1 | A11 | 301 |
| G1 | B12 | 301 |
| G2 | A21 | 401 |
| G2 | B22 | 402 |
| G3 | A31 | 501 |
| G3 | B32 | 502 |

| INTRA-SERVER ROUTING TABLE | | | |
|---|---|---|---|
| SOURCE GATEWAY ID (151-1) | SENSOR ID (152-1) | Flow ID (153-1) | TRAFFIC VOLUME (154-1) |
| G1 | A11 | 101 | 10Mbps |
| G1 | B12 | 102 | 8Mbps |
| G2 | A21 | 101 | 16Mbps |
| G2 | B22 | 102 | 10Mbps |
| G3 | A31 | 101 | 6Mbps |
| G3 | B32 | 102 | 5Mbps |

FIG. 6B

INTRA-SERVER ROUTING TABLE /15-2

| SOURCE GATEWAY ID /151-2 | SENSOR ID /152-2 | Flow ID /153-2 | TRAFFIC VOLUME /154-2 |
|---|---|---|---|
| G1 | A11 | 101 | 10Mbps |
| G1 | B12 | 102 | 8Mbps |
| G2 | A21 | 101 | 16Mbps |
| G2 | B22 | 201 | 10Mbps |
| G3 | A31 | 101 | 6Mbps |
| G3 | B32 | 201 | 5Mbps |

FIG. 7A

GATEWAY CPU LOAD TABLE /16-1

| GATEWAY ID /161-1 | CPU LOAD /162-1 | GATEWAY/SERVER PERFORMANCE RATIO /163-1 |
|---|---|---|
| G1 | 90% | 0.5 |
| G2 | 50% | 0.5 |
| G3 | 30% | 0.75 |

FIG. 7B

GATEWAY CPU LOAD TABLE (16-2)

| GATEWAY ID (161-2) | CPU LOAD (162-2) | GATEWAY/SERVER PERFORMANCE RATIO (163-2) |
|---|---|---|
| G1 | 90% | 0.5 |
| G2 | 60% (10% INCREASE) | 0.5 |
| G3 | 30% (7% INCREASE) | 0.75 |

FIG. 8A

SERVER CPU INFORMATION TABLE (17-1)

| CPU LOAD (171-1) |
|---|
| 90% |

FIG. 8B

SERVER CPU INFORMATION TABLE (17-2)

| CPU LOAD (171-2) |
|---|
| 80% (10% DECREASE) |

FIG. 9A

PROCESS MANAGEMENT TABLE (18-1)

| PROCESS ID | CPU LOAD |
|---|---|
| F2-1 | 10% |
| F3-1 | 15% |
| F4-1 | 20% |
| F5-1 | 15% |

FIG. 9B

PROCESS MANAGEMENT TABLE (18-2)

| PROCESS ID | CPU LOAD |
|---|---|
| F2-1 | 10% |
| F3-1 | 15% |
| F4-1 | 10% |
| F5-1 | 10% |
| F5-2 | 5% |

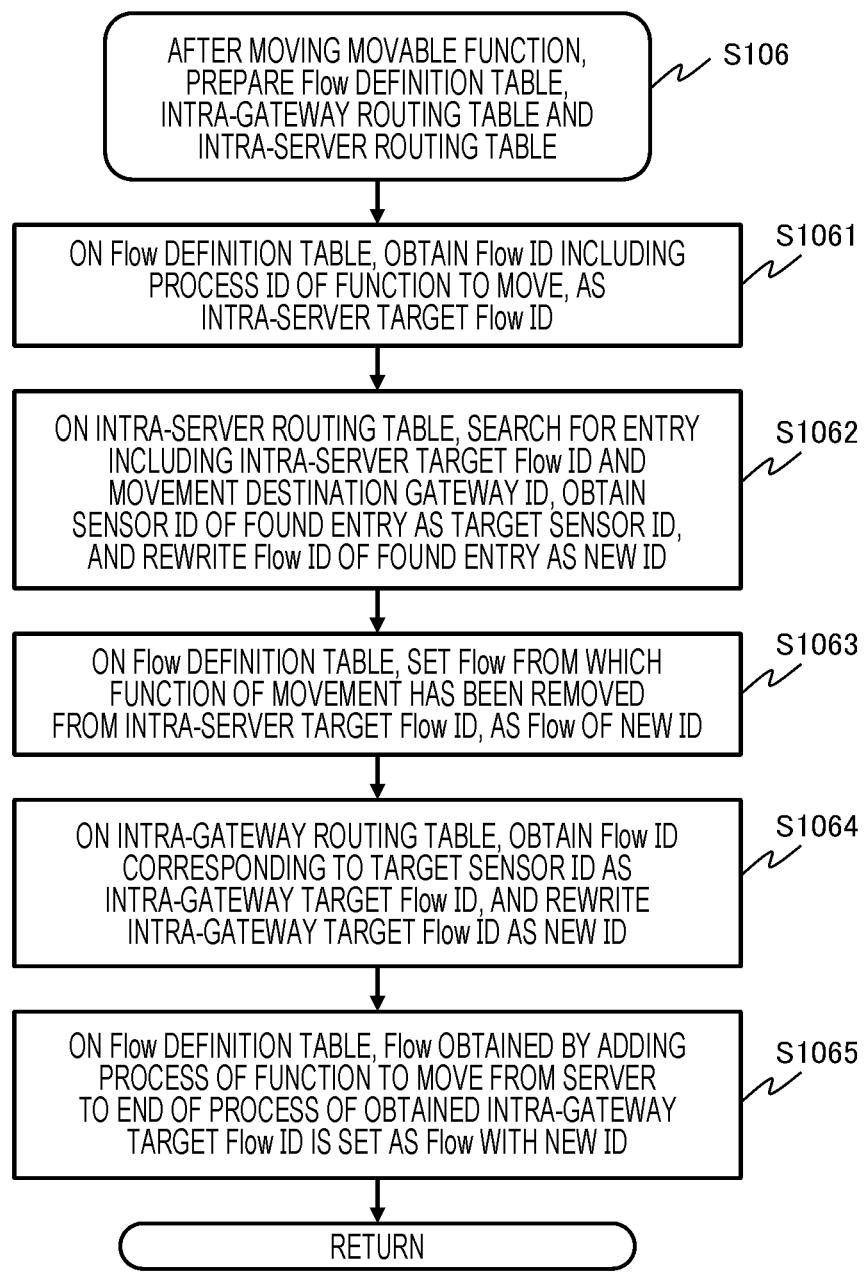

DATA PROCESSING SYSTEM AND METHOD OF CONTROLLING THE SAME

TECHNICAL FIELD

The present invention relates to a data processing system and a method of controlling the system.

BACKGROUND ART

The development of Internet of Things (IoT) is expected to produce business opportunities in services that analyze data collected from sensors and other devices and provide added value. Accordingly, there is a demand for a data processing system that collects a large amount of various types of data at low cost, shapes or processes and thereafter provides data in a form that can be utilized by business applications that conduct analysis, business scheme improvement, or the like.

In recent years, there is a prevailing technology known as edge computing technology that allows a gateway installed in a field for collecting data such as a plant to perform data shaping and processing so as to reduce the amount of communication to servers on a cloud and to implement real-time data processing. This technology has increased the number of cases of configuring a data processing system using a plurality of gateways and a server.

In data collection in IoT, it is necessary to change data processing in accordance with a change in customer requirements and business conditions. In order to facilitate such a change in data processing, there are cases where a plurality of types of general-purpose processing (functions implemented by execution of processing) is sequentially linked to implement data processing. In a case where a data processing system is constituted by a plurality of gateways and a server, a change in data processing might cause an overload state in a specific component, leading to deterioration of system performance or even stoppage of the system.

In contrast, as a technology for reallocating loads among a plurality of components, for example, PTL 1 discloses a technology to dynamically and optimally reallocate content in each of an archive server, an edge server, and a terminal storage device so as to maintain service quality and perform efficient system management.

CITATION LIST

Patent Literature

PTL 1: JP 2004-5309 A

SUMMARY OF INVENTION

Technical Problem

The technology of performing reallocation of PTL 1 is a known technology. However, in a case where data processing is implemented by sequentially linking a plurality of types of processing (functions) in order to facilitate the change in data processing in data collection at IoT, it is not always possible, in the technology disclosed in PTL 1, to reallocate functions while maintaining the order of the processing.

An object of the present invention is to reallocate functions between a gateway and a server while maintaining the order of functions to be applied to data.

Solution to Problem

A representative data processing system according to the present invention is a data processing system which links a plurality of types of processing each of which configured to implement a function, the data processing system including: a gateway for inputting data; a server for inputting data output from the gateway, in which the gateway applies first processing including one or more types of processing to the input data in accordance with information included in first flow information and outputs the processed data to the server, the server applies second processing to the data input from the gateway in accordance with the information included in the first flow information and thereafter applies third processing including one or more types of processing, specifies the second processing, generates, from the first flow information, second flow information including information for applying the third processing to the data input by the server from the gateway, and generates, from the first flow information, the second flow information including information for applying the first processing to the data input by the gateway and thereafter applying the second processing.

Advantageous Effects of Invention

According to the present invention, it is possible to reallocate functions between the gateway and the server while maintaining the order of the functions to be applied to the data.

BRIEF DESCRIPTION OF DRAWINGS

FIG. 2 is a diagram illustrating an example of a data processing function management table.

FIG. 3A is a diagram illustrating an example of a gateway function allocation information table before function reallocation.

FIG. 3B is a diagram illustrating an example of a gateway function allocation information table after function reallocation.

FIG. 4A is a diagram illustrating an example of a Flow definition table before function reallocation.

FIG. 4B is a diagram illustrating an example of a Flow definition table after function reallocation.

FIG. 5A is a diagram illustrating an example of an intra-gateway routing table before function reallocation.

FIG. 5B is a diagram illustrating an example of an intra-gateway routing table after function reallocation.

FIG. 6A is a diagram illustrating an example of an intra-server routing table before function reallocation.

FIG. 6B is a diagram illustrating an example of an intra-server routing table after functional reallocation.

FIG. 7A is a diagram illustrating an example of a gateway CPU information table before function reallocation.

FIG. 7B is a diagram illustrating an example of a gateway CPU information table after functional reallocation.

FIG. 8A is a diagram illustrating an example of a server CPU information table before function reallocation.

FIG. 8B is a diagram illustrating an example of a server CPU information table after function reallocation.

FIG. 9A is a diagram illustrating an example of a process management table before function reallocation.

FIG. 9B is a diagram illustrating an example of a process management table after function reallocation.

FIG. 12 is a flowchart illustrating an example of processing of preparing a table for moving a function.

DESCRIPTION OF EMBODIMENTS

Figure 1A:
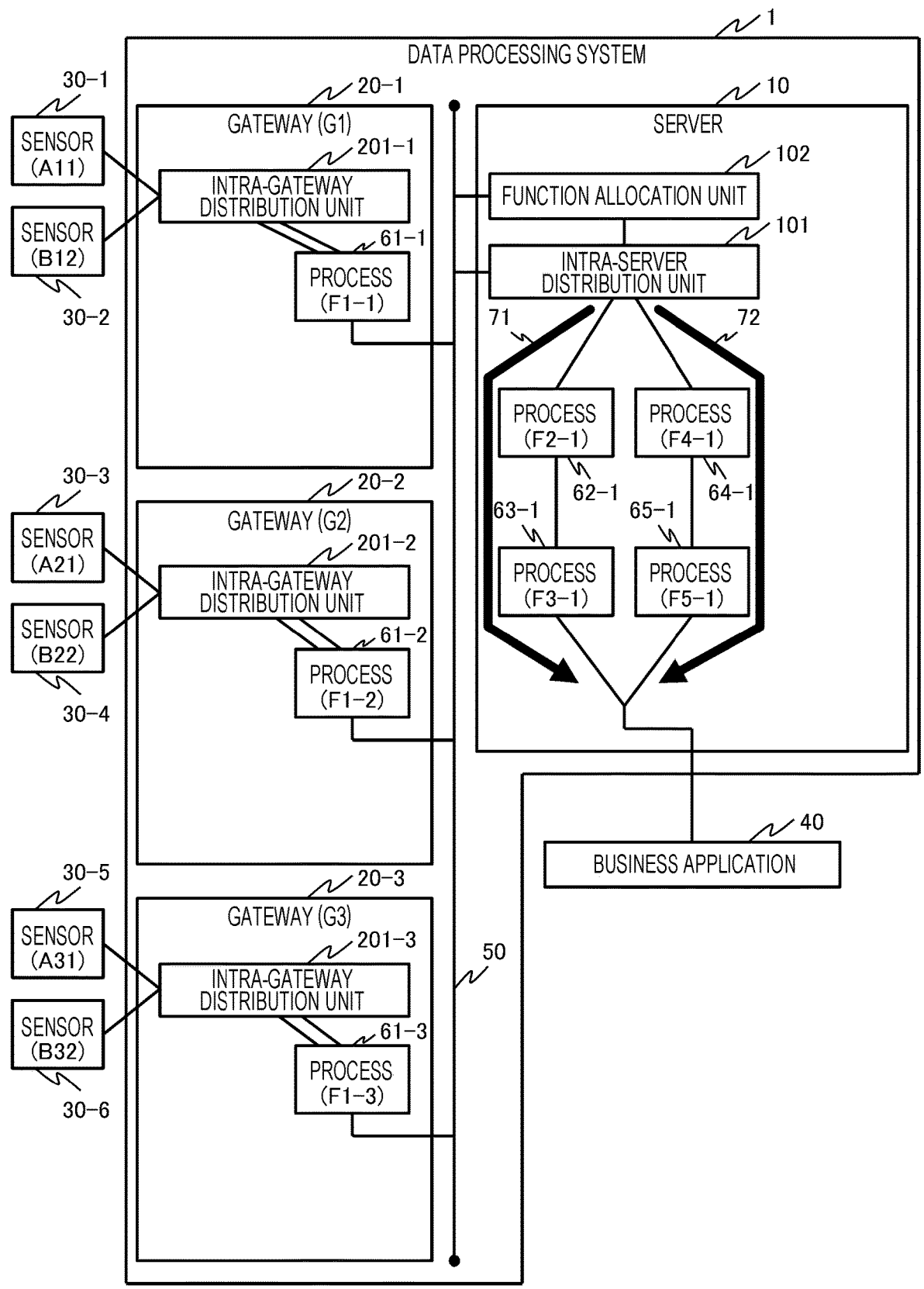
FIG. 1A is a diagram illustrating an example of a configuration of a data processing system before function reallocation.

Hereinafter, embodiments of reallocating a data processing function in a data processing system according to the present invention will be described with reference to the drawings.

Outline of Reallocation of Data Processing Function in Embodiment

The present embodiment will describe an example of reallocation of the data processing function in a data processing system. Specifically, the present embodiment illustrates an operation example of changing the data processing function to be executed in a gateway and a server in accordance with a status change in a data processing system consisting of a plurality of gateways each having a data processing function and a server having a data processing function.

Examples of the status change include an exemplary case where a certain sensor detects an abnormality and the status changes to a state in which more sensor data is transmitted than in a steady state or an exemplary case in which data processing type or the type and number of sensor data used for data analysis are changed in accordance with a change in customer's targets of data analysis.

The data processing function is a function implemented by operation of a data processing module. The data processing module may be a central processing unit (CPU) that executes the program. The CPU may implement the data processing function by executing the program as a process (instance). The CPU may generate a plurality of processes to perform same processing on the basis of a single program. The data processing function will also be simply referred to as a function.

The data processing module may be a hardware module. The hardware module may be a field programmable gate array (FPGA), for example. In the case of using a hardware module, there may be a plurality of hardware modules having a same circuit. It is allowable to execute the plurality of hardware modules.

A plurality of hardware modules of the same circuit may be collectively referred to as one data processing module. The execution of one hardware module may be referred to as the execution of one type of data processing, or the execution of a single process.

Among the drawings illustrating the present embodiment, FIGS. 1A, 3A, 4A, 5A, 6A, 7A, 8A, and 9A illustrate states before function reallocation, and FIGS. 1B, 3B, 4B, 5B, 6B, 7B, 8B, and 9B illustrate states after function reallocation.

In the present embodiment, a status in which the CPU load of a server has increased due to a change to a state involving transmission of a larger amount of sensor data than a steady state as a result of detection of abnormality by a certain sensor is defined as a status before function reallocation, and a state in which server CPU load has been reduced as a result of movement (reallocation) of data processing function from the server to the gateway is defined as a state after functional reallocation. The portion having a difference in the state after the function reallocation with respect to the state before function reallocation is a portion underlined in each of figures illustrating the state after function reallocation in FIG. 1B or the like.

<System Configuration Diagram>

Figure 1B:
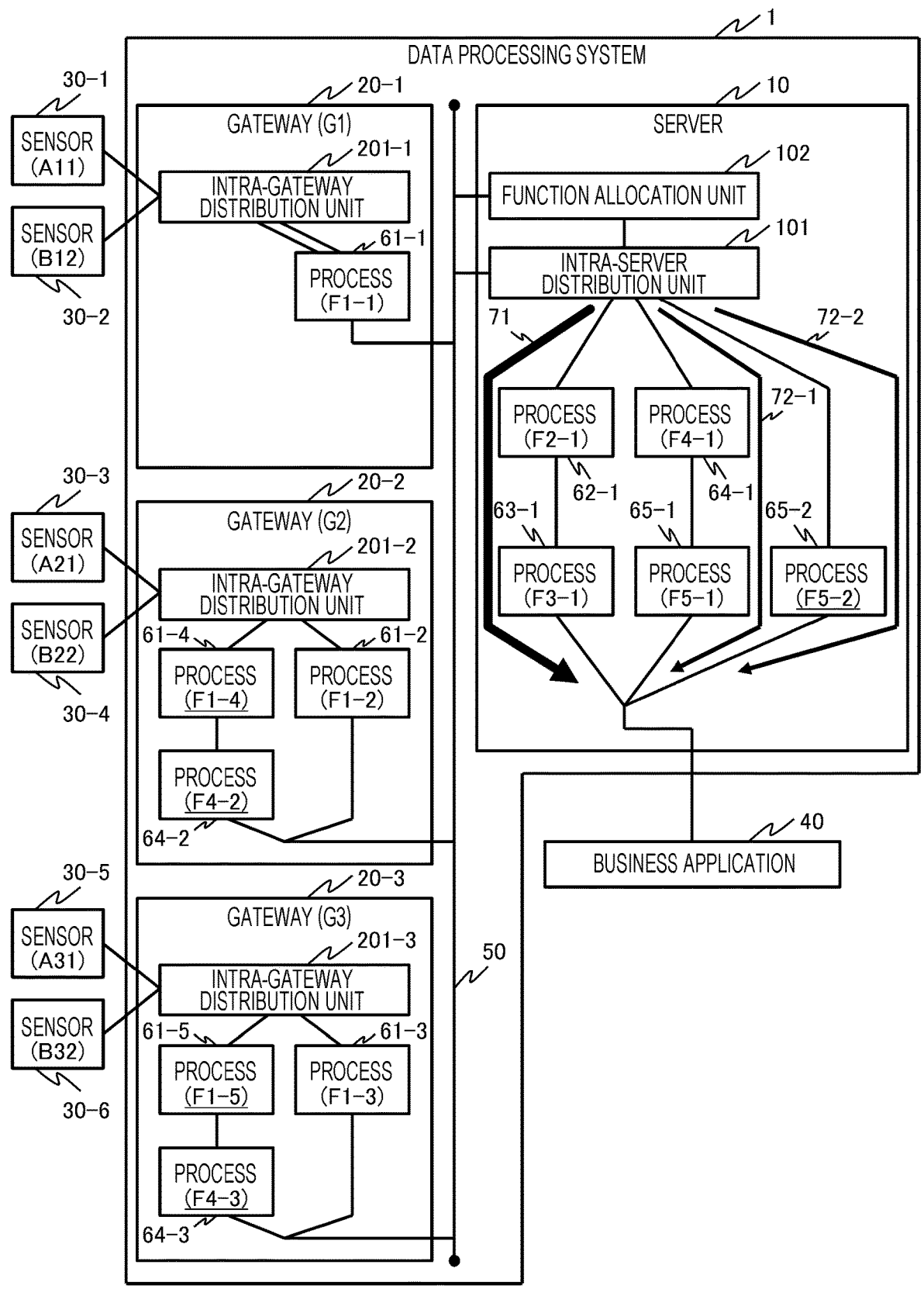
FIG. 1B is a diagram illustrating an example of a configuration of a data processing system after function reallocation.
Figure 1C:
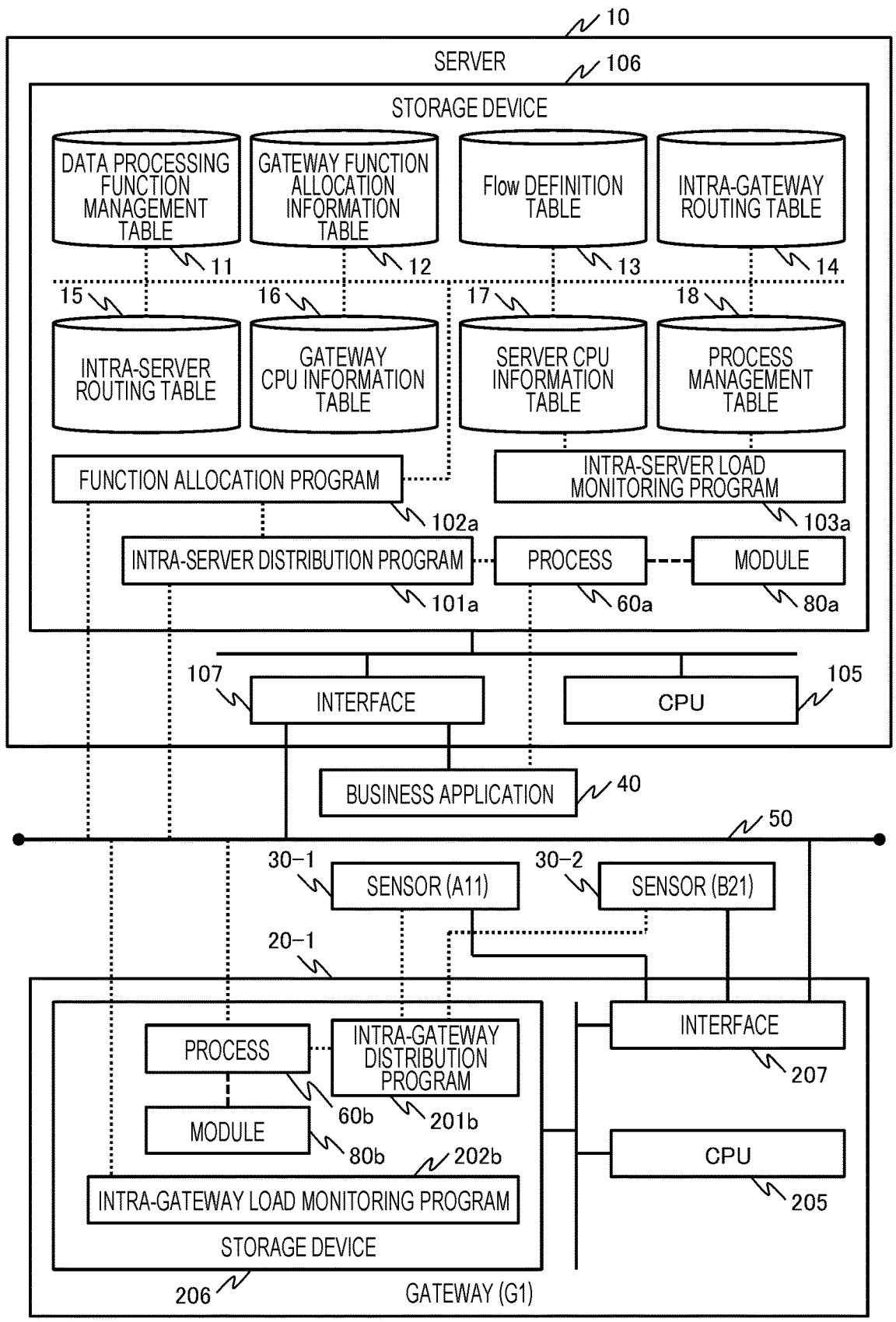
FIG. 1C is a diagram illustrating an example of a configuration of a data processing system.

FIG. 1C is a diagram illustrating an example of a configuration of a data processing system according to the present embodiment. The data processing system includes a server 10 and a gateway 20-1, collects sensor data from sensors 30-1 and 30-2, and transmits a result of data processing to a business application 40. The following description will use the reference numeral without numeral after "–" for the entire constituent elements, and use the reference numeral with numeral after "–" in case of specifying each of the constituent elements.

Examples of the sensor 30 include a sensing device such as a temperature sensor, a humidity sensor, or a vibration sensor. The sensor 30 transmits a measured value as sensor data to a network at prescribed time intervals. The number of sensors 30 may be three or more. The sensor 30-1 has a sensor identifier (ID) of "A11" while the sensor 30-2 has a sensor ID of "B21". In the drawings illustrated below, IDs are written in brackets.

The gateway 20-1 receives sensor data from the sensor 30, processes the received sensor data, and transmits the processed sensor data to the server 10. There may be a gateway other than the gateway 20-1, and a plurality of gateways may be provided. The gateway 20-1 has an ID "G1" assigned, and has a function of processing sensor data.

For processing sensor data or the like, the gateway 20-1 includes a CPU 205 and a storage device 206. The CPU 205 executes a program stored in the storage device 206 and processes data such as sensor data stored in the storage device 206. Through this processing, the gateway 20-1 receives sensor data from the sensor 30 via the interface 207.

Since the processing type of the gateway 20-1 differs depending on the type of sensor data (whether it is the sensor 30-1 or the sensor 30-2), the CPU 205 of the gateway 20-1 executes an intra-gateway distribution program 201b to determine a function to be applied for each of types of the sensor data. At this time, the CPU 205 that executes the intra-gateway distribution program 201b serves as an intra-gateway distribution unit.

The function to be applied is a function implemented by a process 60b. The process 60b is generated by the CPU 205 from a module 80b being a program corresponding to the function. The sensor data output by the process 60b is transmitted from the interface 207 to the server 10 via the network 50.

The gateway 20-1 monitors the load of the CPU 205 of the gateway 20-1 and notifies the load to the server 10 periodically. For this purpose, the CPU 205 executes an intra-gateway load monitoring program 202b. At this time, the CPU 205 that executes the intra-gateway load monitoring program 202b serves an intra-gateway load monitoring unit.

In FIG. 1C, the solid line is a physical communication path and the dotted line is a logical communication path. While the above description is a case where the processing is performed by the CPU 205, there may be hardware defined as an intra-gateway distribution unit instead of the CPU 205 that executes the intra-gateway distribution program 201*b* and there may be hardware defined as an intra-gateway load monitoring unit instead of the CPU 205 that executes the intra-gateway load monitoring program 202*b*.

Furthermore, there may be hardware named a process instead of the process 60*b* executed by the CPU 205. In this case, the intra-gateway load monitoring unit may monitor the load of the hardware named a process. While the module 80*b* is hardware for operating as a process, it may be hardware not in operation.

The server 10 receives sensor data from the gateway 20-1, processes the received sensor data, and transmits the processed sensor data to the business application 40. The server 10 may receive sensor data from a plurality of gateways. For processing sensor data or the like, the server 10 includes a CPU 105 and a storage device 106. The CPU 105 executes a program stored in the storage device 106 and processes sensor data stored in the storage device 206 and data stored in a table.

Through this processing, the server 10 receives the sensor data from the gateway 20-1 via an interface 107. Since the processing type of the server 10 differs depending on the sensor data type and the source gateway, the CPU 105 of the server 10 executes the intra-server distribution program 101*a* to determine the function to be applied in accordance with the sensor data type and the source gateway. At this time, the CPU 105 that executes the intra-server distribution program 101*a* serves as an intra-server distribution unit.

The function to be applied is a function implemented by a process 60*a*. The process 60*a* is generated by the CPU 105 from a module 80*a* being a program. The sensor data output by the process 60*a* is transmitted from the interface 107 to the business application 40.

Each of functions of processing the sensor data has an ID "Fi" ("i" is a variable corresponding to the function type) attached. The server 10 manages the function usable in the gateway or the server on the basis of "Fi". For this purpose, the server 10 includes a data processing function management table 11 storing information regarding functions usable in the gateway or server.

The server 10 includes a gateway function allocation information table 12 storing information regarding functions allocated in each of a plurality of gateways, and manages functions to be allocated in the gateway. In order to flexibly implement the processing of various types of data, the data processing system consisting of the server 10 and a plurality of gateways links a plurality of general-purpose functions to implement specific data processing, rather than implementing processing of specific data as a single function.

For example, in the case of applying fast Fourier transform on vibration sensor data and performing threshold determination of the transformed value and thereby detecting abnormality of a device, the two functions, namely, the function of the fast Fourier transform and the function of threshold determination are mutually linked, so as to configure processing of vibration sensor data. In this manner, decomposing the processing into general-purpose functions would make it possible to easily implement different types of processing such as filtering after fast Fourier transform and assigning index data after threshold determination.

A series of processes applied to the received sensor data in each of the server 10 and the gateway is defined as a Flow. The server 10 manages the Flow being executed in the server 10. Each of gateways manages the Flow being executed in each of the gateways. The server 10 includes a Flow definition table 13 for managing both Flows.

The server 10 also includes an intra-gateway routing table 14 for managing the correspondence between the sensor data type in each of gateways and the Flow applied to the sensor data. The server 10 also includes an intra-server routing table 15 for managing the correspondence between the sensor data type in each of the servers 10 and the Flow applied to the sensor data.

The server 10 also includes a gateway CPU information table 16 that holds CPU load information of each of gateways in order to monitor the status of the data processing load of each of gateways. The server 10 also includes a server CPU information table 17 that holds CPU load information of the server 10 in order to monitor the status of the data processing load of the server 10.

In order to monitor the CPU load of each of processes in the server 10, the server 10 includes a process management table 18 that holds CPU load information for each of processes.

Here, an ID "Fi-j" is assigned to each of the processes. As already described, each of the processes is an execution unit of each of functions. For example, a process having ID "Fi-j" is an execution unit of a function having ID "Fi", in which "i" is a variable corresponding to a function type. A plurality of processes to be the execution units of a same function exists in some cases, in which "j" is a variable indicating the number of duplications of the function, indicating that it is the j-th process.

For example, in a case where a Flow for performing threshold determination on the temperature sensor data and another Flow for performing threshold determination of humidity sensor data are being executed, there are two threshold determination processes. In a case where the ID of the function of threshold determination is "F2", the IDs of the two processes are "F2-1" and "F2-2".

In order to obtain the CPU load information in the server 10, the server 10 causes the CPU 105 to execute an intra-server load monitoring program 103*a*. The CPU 105 stores the obtained CPU load information in the server CPU information table 17 and the process management table 18. At this time, the CPU 105 that executes the intra-server load monitoring program 103*a* serves as an intra-server load monitoring unit.

The server 10 and the gateway 20-1 are connected via a network 50. The network 50 may be a wide area network or a local network, with any network type and connection distance for each of the networks.

The server 10 and the gateway 20-1 may be integrated as one apparatus. For example, the server 10 and the gateway 20-1 may be integrated as a single server or a computer. In this case, the program and data (table) stored in the storage device 106 and the program and data stored in the storage device 206 may be stored in one storage device and be processed by a single CPU.

The single CPU may include a plurality of cores or a plurality of CPUs. A separate core or a CPU may be allocated to each of the processing of the server 10 and the processing of the gateway 20-1. Each of the processing of the server 10 and the processing of the gateway 20-1 may be executed by another virtual machine.

FIGS. 1A and 1B are diagrams illustrating examples of a data processing system 1 including the server 10, the gateway 20-1, a gateway 20-2, and a gateway 20-3. The server 10 illustrated in FIGS. 1A and 1B is the server 10 described with reference to FIG. 1C. The CPU 105 that executes the intra-server distribution program 101*a* serves as an intra-server distribution unit 101 and the CPU 105 that executes a function allocation program 102*a* serves as a function allocation unit 102.

Processes 62-1 to 65-2 in the server 10 illustrated in FIG. 1A or 1B are the process 60a described with reference to FIG. 1C, illustrated with ID of each of processes in brackets. One or two linked processes of Processes 62-1 to 65-2 constitute Flow 71, Flow 72, Flow 72-1, or Flow 72-2.

Each of the gateway 20-1, the gateway 20-2, and the gateway 20-3 illustrated in FIGS. 1A and 1B has the same structure as that of the gateway 20-1 described with reference to FIG. 1C. The CPU 205 that executes the intra-gateway distribution program 201b serves as the intra-gateway distribution unit 201-1, the intra-gateway distribution unit 201-2, and the intra-gateway distribution unit 201-3, individually.

Each of the sensors 30-1 to 30-6 illustrated in FIGS. 1A and 1B may have the same structure as any of the sensors 30 described with reference to FIG. 1C. Therefore, the sensor 30-1 to the sensor 30-6 are also collectively described as the sensor 30. The gateway 20 and the intra-gateway distribution unit 201 are also described in a same manner.

Processes 61-1 to 64-3 included in any of the gateways 20 illustrated in FIG. 1A or 1B are the process 60b described with reference to FIG. 1C, illustrated with ID of each of processes in brackets.

The allocation of each of processes illustrated in FIG. 1A and FIG. 1B will be described below. In the configuration described with reference to FIG. 1C, configurations (storage device 106 etc.) that need not be directly referred to in the allocation of each of processes are not illustrated in FIGS. 1A and 1B.

<Description of Individual Tables>

In the following, information contained in each of tables held by the server 10 will be described. A difference between the information included in the table before function reallocation and the information included in the table after function reallocation will be described below.

FIG. 2 is a diagram illustrating an example of a data processing function management table 11. The data processing function management table 11 is a table for managing functions implementable by the server 10 and the gateway, and has fields of a data processing function ID 111, processing type 112, and on-gateway executability 113.

The ID of the function is stored in the field of the data processing function ID 111. Although the information on the processing for realizing the function is stored in the field of the processing type 112 and "data format conversion" or the like is made for easy understanding in FIG. 2, it is not limited thereto, and for example, the function Other information indicating the processing name of the processing object may be stored. The fields may also store a file name of a program module that implements a function, a program code, or a pointer to the program code.

The functions managed using the data processing function management table 11 include functions implementable only by the server 10. In other words, the function managed using the data processing function management table 11 is a function implementable by the server 10 and is not always implementable by the gateway 20.

In the field of the on-gateway executability 113, information of "enabled" or "disabled" is stored depending on whether it is implementable by the gateway 20. For example, processing of "comparison of plurality of sensors" of processing type 112 having "F6" as data processing function ID 111 is processing of comparing sensor data collected from sensors of a plurality of gateways 20. This processing can only be executable by the server 10 that integrates sensor data of the plurality of gateways 20 and cannot be executed by the gateway 20. Accordingly, "disabled" is stored in the field of the on-gateway executability 113.

As already described, a certain function is implemented by execution of a process. Accordingly, the information "enabled" and "disabled" in the on-gateway executability 113 also indicates executability of the process corresponding to the information on the gateway 20.

Additionally, a line in the table of the data processing function management table 11 (for example, information associating "F2", "threshold determination" and "enabled" in the second line with each other) will be hereinafter referred to as an entry, and information associating, in the example of FIG. 2, "F1", "data format conversion" and "enabled" in the first line with each other will be referred to as a head entry. Other lines on the table will also be referred to as entries.

FIGS. 3A and 3B are diagrams illustrating an example of the gateway function allocation information table 12. The gateway function allocation information table 12 is a table for managing functions implemented by each of the gateways 20, and includes fields of a gateway ID 121 and an allocation function ID list 122.

The field of the gateway ID 121 stores ID of each of gateways 20. The field of the allocation function ID list 122 stores ID of the function implemented by each of the gateways 20.

Here, the function implemented by the gateway 20 represents a state in which a process for implementing the function has been generated (state in which process is being executed or executable). The "enabled" in the field of the on-gateway executability 113 on the data processing function management table 11 includes a process generatable state before the process is generated (executable after generation of the process) in addition to the state in which the process has been generated.

FIGS. 4A and 4B are diagrams illustrating an example of the Flow definition table 13. The Flow definition table 13 is a table for managing the Flow executed in each of the server and the gateway 20. Execution of the Flow linking a plurality of functions is execution of a process that implements the functions included in the Flow. Accordingly, Flow is defined as a list of "Fi-j" which is the ID of the process in contrast to "Fi" as ID of a function included in Flow.

The Flow definition table 13 includes fields of an allocation position 131, a Flow ID 132, and a process list 133. The field of the allocation position 131 stores information indicating whether the Flow is allocated in the server 10 or indicating which gateway out of the gateway 20 is a gateway in which the Flow is allocated.

In the example of FIGS. 4A and 4B, "Serv" is stored in a case where the Flow is allocated in the server 10, and ID corresponding to the gateway ID 121 on the gateway function allocation information table 12 is stored in a case where the Flow is allocated in the gateway 20. Flow ID is stored in the field of Flow ID 132.

In the field of the process list 133, process IDs are stored as a list in order. Since the process ID has an order, "F2-1" of "order 1" is referred to as a head process ID, and "F3-1" of "order 2" is referred to as a next process ID, for example.

The function allocation unit of the server 10 sets the information in the Flow definition table 13 to the intra-server distribution unit 101 of the server 10, and transmits the information to the gateway 20 so that each of the gateways 20 performs setting in the intra-gateway distribution unit 201.

Alternatively, the CPU 105 of the server 10 may execute the intra-server distribution program 101a to obtain the information of the Flow definition table 13. Still alternatively, the CPU 105 may execute the function allocation program 102a to transmit the information of the Flow definition table 13 to the gateway 20, and the CPU 205 of each of gateways 20 may execute the intra-gateway distribution program 201b to receive the information of the Flow definition table 13.

FIG. 5A and FIG. 5B are diagrams illustrating an example of the intra-gateway routing table 14. The intra-gateway routing table 14 is a table for managing and controlling a data transfer rule in the intra-gateway distribution unit 201 of the gateway 20. That is, the intra-gateway distribution unit 201 receives the information of the intra-gateway routing table 14, and thereafter distributes the sensor data from the sensor 30 to the process in each of the gateways 20 on the basis of the information.

The intra-gateway routing table 14 includes fields of a gateway ID 141, a sensor ID 142, and a Flow ID 143. The field of the gateway ID 141 stores an ID corresponding to the gateway ID 121 of the gateway function allocation information table 12.

The field of the sensor ID 142 stores the ID of the sensor 30. The field of the Flow ID 143 stores an ID corresponding to the Flow ID 132 of the Flow definition table 13. The function allocation unit 102 of the server 10 transmits the information of the intra-gateway routing table to the gateway 20 so that each of gateways 20 sets the information to the intra-gateway distribution unit 201.

FIGS. 6A and 6B are diagrams illustrating an example of the intra-server routing table 15. The intra-server routing table 15 is a table for managing and controlling data transfer rules in the intra-server distribution unit 101 of the server 10. That is, the intra-server distribution unit 101 receives the information of the intra-server routing table 15, and thereafter distributes the sensor data from the gateway 20 to the process in the server 10 on the basis of the information.

To achieve this, the sensor data transmitted from the gateway 20 to the server 10 is provided with an ID of the gateway 20 that performs the transmission and an ID (sensor data type) of each of the sensors 30 as source of the sensor data.

The intra-server routing table 15 includes fields of a source gateway ID 151, a sensor ID 152, a Flow ID 153, and a traffic volume 154. The field of the source gateway ID 151 stores an ID corresponding to the gateway ID 141 of the intra-gateway routing table 14, that is, an ID to be compared with the ID of each of gateways 20 which transmitted the sensor data, attached to the sensor data.

Three field of the sensor ID 152 stores an ID corresponding to the sensor ID 142 of the intra-gateway routing table 14, that is, an ID to be compared with the ID of the sensor which is the source of the sensor data, attached to the sensor data.

The field of the Flow ID 153 stores an ID corresponding to the ID of the Flow ID 132 on the Flow definition table 13, that is, an ID of Flow having the allocation position 131 of "Sere", being ID of Flow in the server 10.

The field of the traffic volume 154 stores a traffic volume of the sensor data measured for each of Flows in the server 10 in units of "Mbps", for example. The information stored in the field of the traffic volume 154 may be periodically updated or may be updated at a timing of detecting an event in a case where there is such an event involving a change in the traffic volume of the sensor data.

The function allocation unit 102 of the server 10 sets the information of the intra-server routing table 15 to the intra-server distribution unit 101 in the server 10. Alternatively, the CPU 105 of the server 10 may execute the intra-server distribution program 101a to obtain the information of the intra-server routing table 15.

FIGS. 7A and 7B are diagrams illustrating an example of the gateway CPU information table 16. The gateway CPU information table 16 is a table used by the server 10 to monitor the CPU load of each of the gateways 20. Here, the CPU load is the load of the CPU 205 in FIG. 1C, for example.

The gateway CPU information table 16 includes fields of a gateway ID 161, a CPU load 162, and a gateway/server performance ratio 163. The field of the gateway ID 161 includes ID corresponding to the gateway ID 141 of the intra-gateway routing table 14.

The field of the CPU load 162 stores a CPU load ratio at the time of measurement when the maximum limit of the CPU load is defined as 100%. The field of the gateway/server performance ratio 163 stores the ratio of the performance of the CPU 205 of each of gateways 20 to the performance of the CPU 105 of the server 10 measured in advance.

FIGS. 8A and 8B are diagrams illustrating an example of the server CPU information table 17. The server CPU information table 17 is a table used by the server 10 to monitor the CPU load of the server 10. Here, the CPU load is the load of the CPU 105 in FIG. 1C, for example. The server CPU information table 17 includes a field of CPU load 171 and stores, for example, the ratio of the CPU load at the time of measurement, when the maximum limit of the CPU is defined as 100%.

FIGS. 9A and 9B are diagrams illustrating an example of the process management table 18. The process management table 18 is a table used by the server 10 to monitor the CPU load of each of processes in the server 10, and includes fields of process ID 181 and CPU load 182.

The field of the process ID 181 stores an ID of a process stored in the field of the process list 133 having the allocation position 131 being "Sere" on the Flow definition table 13. The field of the CPU load 182 stores the CPU load at the time of executing the process of the ID stored in the field of the process ID 181.

Example of Position and Order of Processing of Sensor Data in Data Processing System With reference to FIG. 1A, an example of the position and order of processing of sensor data during processing from the sensor 30 to the business application 40 in the data processing system 1 will be described.

As an example, in FIG. 1A, the sensor 30-1 transmits its sensor ID "A11" and sensor data storing sensor values to the gateway 20-1. Here, the sensor data may include information other than the sensor ID and the sensor value, and may include time stamp data indicating the time of measurement of the sensor value.

As described below, the gateway 20-1 having received the sensor data from the sensor 30-1 sets the Flow of the data processing to be applied to the received sensor data in the intra-gateway distribution unit 201-1, that is, the sensor data is distributed to processes.

The intra-gateway distribution unit 201-1 has information of the entry having "G1" as the gateway ID 141-1 on the intra-gateway routing table 14-1 included in the server 10. Using the information set in this manner, the sensor ID "A11" of the received sensor data is used to obtain ID "301" in the field of Flow ID 143-1 matching "A11" in the sensor ID 142-1.

Moreover, the intra-gateway distribution unit 201-1 has information of "G1" being set in the allocation position 131-1 of the Flow definition table 13-1 of the server 10. The information set in this manner is used to obtain "F1-1" of the process list 133-1 matching ID "301" in Flow ID 132-1.

According to the obtained "F1-1", the intra-gateway distribution unit 201-1 distributes the received sensor data to the process 61-1, the process 61-1 processes the sensor data, and the gateway 20-1 transmits to the server 10 a packet storing "G1" as the gateway ID and "A11" as the sensor ID in the payload.

As described below, the server 10 having received the sensor data from the gateway 20-1 sets the Flow of the data processing to be applied to the received sensor data in the intra-server distribution unit 101, that is, the sensor data is distributed to processes.

Since the information in the intra-server routing table 15-1 has been set, the source gateway ID 151-1 matches in "G1", and the sensor ID 152-1 matches in "A11", the intra-server distribution unit 101 of the server 10 obtains "101" of Flow ID 153-1 as the Flow ID as an application target.

The intra-server distribution unit 101 has information of "Sere" being set in the allocation position 131-1 of the Flow definition table 13-1. This information set in this manner is used to obtain "F2-1" and "F3-1" of the process list 133-1 that matches "101" with Flow ID 132-1 together with the order of these process IDs.

In accordance with the obtained "F2-1" and "F3-1", the intra-server distribution unit 101 distributes the received sensor data to Flow 71 (process 62-1). Thereafter, the process 62-1 first processes the received sensor data, and then, the process 63-1 processes the sensor data output from the process 62-1. Subsequently, the process 63-1 transmits a packet storing the processed sensor data in the payload to the business application 40.

Also in the server 10, the sensor data of the sensor 30-3 and the sensor 30-5 respectively having sensor IDs "A21" and "A31" are provided with Flow ID 153-1 being "101", and accordingly, distributed to Flow 71.

In the server 10, the sensor 30-2, the sensor 30-4, and the sensor 30-6 respectively having sensor IDs "B12", "B22" and "B32" are provided with Flow ID 153-1 being "102". The intra-server distribution unit 101 distributes the process to Flow 72 (process 64-1) in accordance with "F4-1" and "F5-1" in the process list 133-1 that matches "102" at Flow ID 132-1.

As described above, the position and order of processing of the sensor data are determined by the Flow definition table 13, the intra-gateway routing table 14, and the intra-server routing table 15. Accordingly, the information regarding these tables may collectively be referred to as flow information.

Example of Processing of Changing Function Allocation

Figure 10:
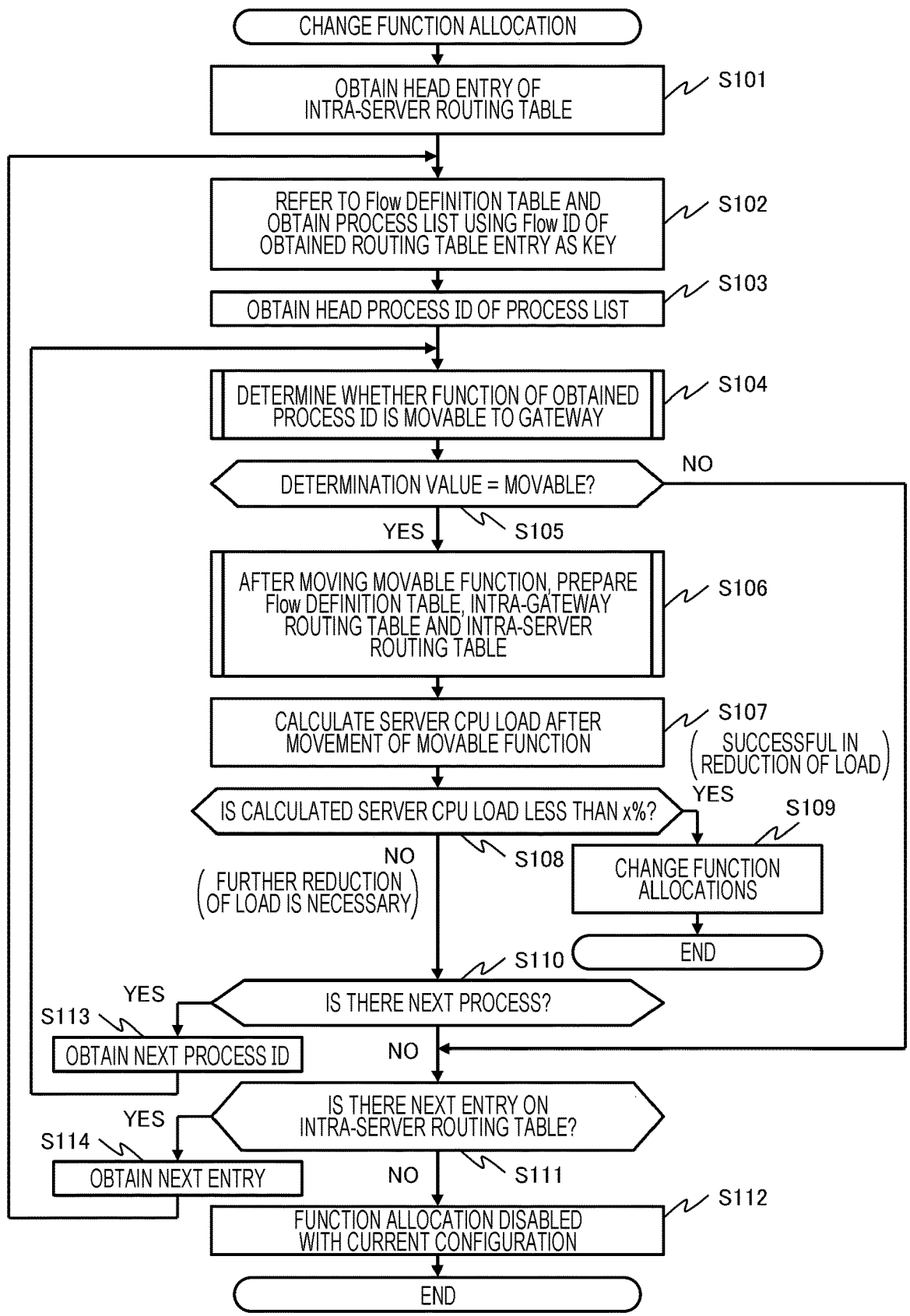
FIG. 10 is a flowchart illustrating an example of processing of changing function allocation.

FIG. 10 is a diagram illustrating an example of a flowchart used by the functional allocation unit 102 of the server 10 to change the function allocation. The function allocation unit 102 executes processing of this flowchart each time the CPU load of the server 10 exceeds a preset value. In the following, description using the function allocation unit 102 as a subject may be substituted by description using the CPU 105 executing the function allocation program 102a as the subject.

The function allocation unit 102 refers to the head entry of the intra-server routing table 15 to obtain the information of the fields of the source gateway ID 151 and the Flow ID 153 (step S101). The function allocation unit 102 then refers to the Flow definition table 13 with the obtained Flow ID as a key and obtains the process ID of the field of the process list 133 of the entry matching the key in Flow ID 132 (step S102).

The function allocation unit 102 obtains the head process ID out of the obtained process ID (step S103). The reason for obtaining the head process ID is that data processing in the data processing system 1 defines the order of functions (processes) in each of Flows and it is necessary to maintain the order of the functions. Accordingly, the candidate of the function to be moved from the server 10 to the gateway 20 is the process at the head of each of Flows in the server 10.

Next, the function allocation unit 102 determines whether the function (Fi) of the obtained process ID (Fi-j) is movable to the gateway 20 having the obtained (source) gateway ID (step S104). Here, in a case where step S104 is executed following step S103, the obtained process ID is the process ID obtained in step S103, and the obtained gateway ID is the gateway ID obtained in step S101.

This determination includes determination based on information on the field of the on-gateway executability 113 of the data processing function management table 11 and determination based on the surplus amount of CPU capability for the CPU load of the gateway 20. A result of the determination is represented as a determination value indicating whether function movement is possible or not, and details will be described below using the flowchart illustrated in FIG. 11.

The function allocation unit 102 determines whether the determination value indicates function mobility (step S105). In a case where it is determined that the function movement is possible (step S105: YES), the function allocation unit 102 executes step S106. In step S106, the function allocation unit 102 prepares for changing the Flow definition table 13, the intra-gateway routing table 14, and the intra-server routing table 15 after function movement determined to be executable (step S106). This preparation will be described below using the flowchart illustrated in FIG. 12.

Subsequently, the function allocation unit 102 calculates the CPU load of the server 10 at the time of function movement determined to be executable (step S107). The function allocation unit 102 determines whether the calculated CPU load of the server is less than a target value x % (x is a preset value) (step S108). In a case where it is determined that the value is less than the target value x % (step S108: YES), the function allocation unit 102 actually changes the Flow definition table 13, the intra-gateway routing table 14, and the intra-server routing table 15 on the basis of the preparation of step S106 and performs function movement determined as executable (step S109), so as to complete function allocation change.

In a case where the function allocation unit 102 determines in step S105 that the function movement is not possible (step S105: NO), it would be difficult to maintain the order with the function that has not been moved due to the determination of unmovable even if the function subsequent to the function determined to be unmovable is movable, and thus, the function allocation unit 102 proceeds to the determination of the next entry in step S111.

In a case where the function allocation unit 102 determines in step S108 that the CPU load of the server would not be reduced to less than the target value x % even by the movement of the function determined to be executable (step S108: NO), the function allocation unit 102 determines whether the next process exists (step S110) by the process list obtained in step S102. In a case where it is determined that there is a next process (step S110: YES), the function allocation unit 102 obtains a next process ID (step S113), and uses the obtained process ID, to retry the step S104 or subsequent steps.

In a case where the function allocation unit 102 determines in step S110 that there is no next process (step S110: NO), the function allocation unit 102 determines whether the next entry in the intra-server routing table 15 exists. In a case where it is determined that the next entry exists (step S111: YES), the next entry is obtained (step S114) and the steps after step S102 are retried using the obtained entry.

In a case where the function allocation unit 102 determines in step S111 that there is no next entry in the intra-server routing table 15 (step S111: NO), this means that there are no more candidates of movable function, and reduction of the server CPU load would be difficult even by the functional reallocation with the current calculation resource. According, the function allocation unit 102 finishes the processing without changing function allocation. Here, even when there is information prepared in step S106, the information would be discarded.

Figure 11:
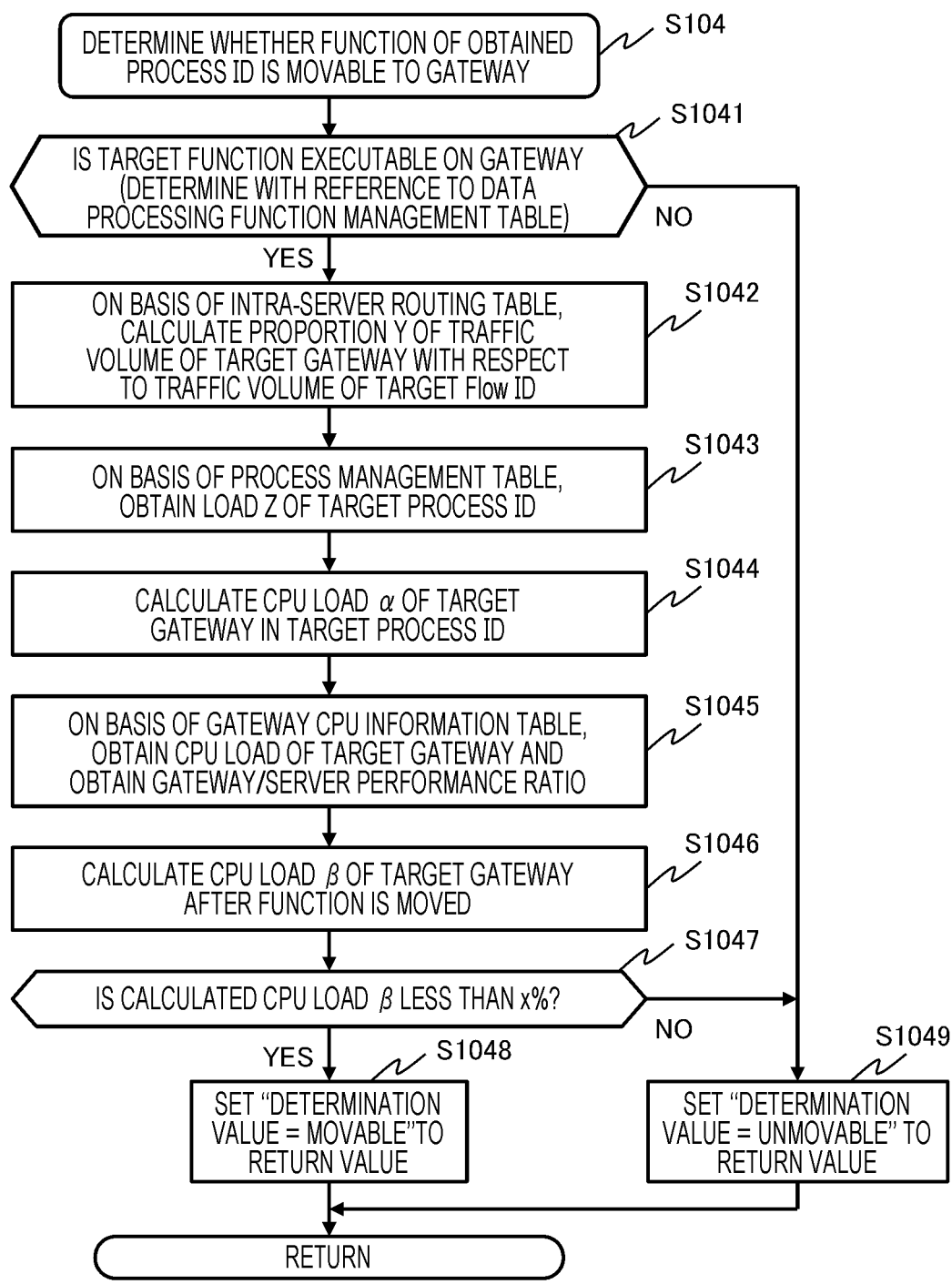
FIG. 11 is a flowchart illustrating an example of processing of determining whether a function is movable to a gateway.

Example of Processing of Determining Whether Function of Process ID is Movable to Designated Gateway FIG. 11 is a flowchart specifically illustrating processing of determining whether the function of the process ID illustrated in step S104 in FIG. 10 is movable to the gateway.

The function allocation unit 102 determines whether the function (target function) having the process ID (target process ID) obtained in step S103 or step S113 of FIG. 10 is movable to the gateway (target gateway) having ID of the source gateway ID 151 of the entry obtained in step S101 or step S114 of FIG. 10.

The function allocation unit 102 extracts the target function ID (Fi) from the target process ID (Fi-j), refers to the data processing function management table 11 with the target function ID (Fi) as a key, and then determines whether the field of the on-gateway executability 113 corresponding to the ID which matches the key in the field of the data processing function ID 111 is set to "enabled" or "disabled" (step S1041).

In the case where it is determined to be "disabled" (step S1041: NO), the function allocation unit 102 sets "determination value=movement disabled" as a return value (step S1049), returns to the flowchart illustrated in FIG. 10, and proceeds to step S105.

In step S1041, in a case where the function allocation unit 102 determines that it is "enabled" (step S1041: YES), the function allocation unit 102 refers to the intra-server routing table 15 and obtains the ID (target Flow ID) of the field of the Flow ID 153 among information of the entry obtained in step S101 or step S114 of FIG. 10, and then, calculates the total traffic volume of the Flow having the same ID as the obtained target Flow ID.

Then, the function allocation unit 102 calculates a proportion Y of the traffic volume (traffic volume of the target gateway) of the field of the traffic volume 154 among the information of the obtained entry, with respect to the calculated total traffic volume (step S1042).

For example, when the target Flow ID is "101", the total traffic volume with Flow ID "101" in FIG. 6A can be: 10 Mbps+16 Mbps+6 Mbps=32 Mbps. Here, the proportion Y of the traffic volume with the gateway ID "G2" (target gateway) with the Flow ID "101" of the third entry from the top with respect to the total traffic volume with Flow ID "101" can be calculated as: Y=16 Mbps/32 Mbps=0.5.

Next, with reference to the process management table 18 and using the target process ID as a key, the function allocation unit 102 obtains a load Z (%) of the field of the CPU load 182 corresponding to the ID matching the key in the process ID 181 (step S1043).

The function allocation unit 102 multiplies the load Z (%) obtained in step S1043 by the proportion Y calculated in step S1042 so as to calculate CPU load α (%) of the target gateway in the process (of processing sensor data of plurality of gateways) with the target process ID (step S1044).

For example, in the case of discussing the CPU load of the process (F2-1), the CPU load, that is, the load Z of the process ID "F2-1" in FIG. 9A, is "10%" and the proportion Y is "0.5". Accordingly, the CPU load α (%) of the target gateway having the gateway ID of "G2" is calculated as: α=Z×Y=10%×0.5=5%.

Subsequently, the function allocation unit 102 uses the gateway CPU information table 16 to obtain information of the CPU load 162 and the gateway/server performance ratio 163 corresponding to the ID matching the target gateway ID in the gateway ID 161 (step S1045), and calculates CPU load β (%) of the target gateway after function movement (step S1046).

The function allocation unit 102 obtains this CPU load β (%) by calculating (CPU load of target gateway)+(CPU load α divided by gateway/server performance ratio). On the basis of the calculated CPU load β (%), the function allocation unit 102 determines in step S1047 whether the movement is to be enabled with the surplus capability of the CPU performance of the target gateway in the case of function movement is performed (step S1047).

To achieve this, the function allocation unit 102 determines whether the CPU load β (%) is less than a target value x % (x is a preset value), and in a case where it is determined that the value is less than the target value x % (step S1047: YES), the function allocation unit 102 sets "determination value=movable" as a return value (step S1048), and then, processing returns to the flowchart illustrated in FIG. 10 and proceeds to step S105.

In a case where it is determined in step S1047 that the CPU load β (%) is the target value x % or more (step S1047: NO), the function allocation unit 102 sets "determination value=unmovable" as a return value (step S1049), and then, processing returns to the flowchart illustrated in FIG. 10 and proceeds to step S105.

Example of Preparation of Flow Definition Table 13, Intra-Gateway Routing Table 14, and Intra-Server Routing Table 15 for Function Movement FIG. 12 is a flowchart for specifically illustrating preparation for changing the Flow definition table 13, the intra-gateway routing table 14, and the intra-server routing table 15 for function movement of the process ID to the gateway illustrated in step S106 of FIG. 10.

Practical changes of the Flow definition table 13, the intra-gateway routing table 14, and the intra-server routing table 15 are performed in step S109 illustrated in FIG. 10. Therefore, in a case where step S112 is executed, information prepared for the change would be discarded without execution of practical changes.

Therefore, each of the Flow definition table 13, the intra-gateway routing table 14, and the intra-server routing table 15 is temporarily duplicated and used for preparing for the change. The following description, however, uses expressions such as the Flow definition table 13, the intra-gateway routing table 14, and the intra-server routing table also to represent temporary tables to be used for preparation for change in order to facilitate understanding of the correspondence with the original tables.

Alternatively, it would be also possible to omit temporal duplication of the Flow definition table 13, the intra-gateway routing table 14, and the intra-server routing table 15. In this case, reference to information can be performed by reading from each of the original tables, and rewriting of information can be performed by temporarily saving target information in a region outside the original table and then rewriting in step S109 the original tables using the saved information.

The data processing system 1 links a plurality of functions and executes processes of the linked functions in the order of linking, thereby processing sensor data, and thus, it is necessary to move a function while maintaining the order of functions.

In order to move the function from the server 10 to the gateway 20, the function allocation unit 102 first specifies a Flow including a process corresponding to the function moved from the server 10, and generates information for changing the specified Flow of the server 10.

Thereafter, the function allocation unit 102 specifies the Flow of the gateway 20 related to the specified Flow of the server 10, and generates information for changing the specified Flow of the gateway 20. In this manner, sequentially specifying the Flow of the server 10 and the Flow of the gateway 20 in order to move function is a feature of the present embodiment.

Hereinafter, a procedure for preparing a specific change will be described. It is assumed, as described using the flowchart illustrated in FIG. 10, that the process ID of the function to be moved and the gateway ID of the movement destination are determined at the time of execution of step S106.

Initially, the function allocation unit 102 refers to the Flow definition table 13 and obtains the ID of the Flow ID 132 of the entry including the ID of the process of the function to be moved in the process list 133 as an intra-server target Flow ID (step S1061).

Next, the function allocation unit 102 searches, in the intra-server routing table 15, for an entry that includes the intra-server target Flow ID in the Flow ID 153 and that includes the gateway ID of the movement destination in the source gateway ID 151. Subsequently, the function allocation unit 102 obtains the ID of the sensor ID 152 of the entry found in the search as the target sensor ID, and rewrites the ID of the Flow ID 153 (intra-server target Flow ID) of the found entry to new ID (step S1062).

In the Flow definition table 13, the function allocation unit 102 removes the process ID of the function to be moved from the process list 133 for the entry including the intra-server target Flow ID obtained in the step S1061 in the Flow ID 132, and sets the new ID set in the step S1062 to the Flow ID 132, thereby defining the Flow from which the process of the function to be moved has been removed, as a Flow of the new ID (step S1063).

At this time, the function allocation unit 102 also sets a new ID to the process ID of the process (remaining process without being moved) included in the Flow of the new ID. However, in a case where Flow formed with a process having the same function as that of the process constituting the Flow of the new ID already exists, new IDs of the Flow ID 132 and the Flow ID 152 are to be changed to the existing Flow ID, and the Flow is to be applied.

This completes preparations for changing the server portions of the Flow definition table 13 and the intra-server routing table 15. Subsequently, the function allocation unit 102 prepares for the change in a gateway portion of the Flow definition table 13 and the change in the intra-gateway routing table 14.

On the intra-gateway routing table 14, the function allocation unit 102 obtains the ID of the Flow ID 143 of the entry including the target sensor ID obtained in step S1062 in the sensor ID 142 as the intra-gateway target Flow ID, and rewrites the intra-gateway target Flow ID to the new ID (step S1064).

Next, on the Flow definition table 13, the function allocation unit 102 adds a new ID of a process of a function to be moved from the server 10 to the end of the order of the process list 133 to the entry including the intra-gateway target Flow ID obtained in step S1064 as Flow ID 132, and rewrites the intra-gateway target Flow ID of the Flow ID 132 to the new ID, thereby setting the Flow to which the process of the new ID has been added as a Flow of the new ID (step S1065).

However, in a case where a Flow formed with a process having the same function as that of the process constituting the Flow of the new ID already exists, new IDs of the Flow ID 132 and the Flow ID 143 are to be changed to the existing Flow ID, and the Flow is to be applied.

The above completes preparations for changing the gateway portions of the Flow definition table 13 and the intra-gateway routing table 14.

A specific content example of each of tables according to the flowchart described with reference to FIG. 12 will be described as an example in which a function (F4) is moved from the server 10 to the gateway 20-2. When this movement is performed, a part of a process (F4-1) of the server 10 is removed and a process (F4-2) of the gateway 20-2 is added.

Note that also here the temporarily duplicated table prepared for modification will be described as the Flow definition table 13, the intra-gateway routing table 14, and the intra-server routing table 15.

First, with reference to the Flow definition table 13-1 illustrated in FIG. 4A, the function allocation unit 102 obtains "102" of the Flow ID 132-1 including "F4-1" already obtained as the process ID of the function (F4) to be moved in the process list 133-1, and sets such that intra-server target Flow ID=102 (step S1061).

Next, the function allocation unit 102 searches, in the intra-server routing table 15-1, for an entry that includes "102" (intra-server target Flow ID=102) in the Flow ID 153-1 and that includes "G2" (movement destination gateway ID=G2) in the source gateway ID 151-1. Subsequently, the function allocation unit 102 obtains "B22" of the sensor ID 152-1 of the entry found in the search, as the target sensor ID.

Next, the function allocation unit 102 rewrites "102" of the intra-server target Flow ID, that is, of Flow ID 153-1 of the entry that has been found, to "201" as a new ID (step S1062). FIG. 6B includes an example of the intra-server routing table 15-2 after partial rewriting has been performed. The Flow ID 153-2 in the entry having sensor ID 152-2 of "B 22" is rewritten to "201".

On the Flow definition table 13-1, the function allocation unit 102 sets the Flow obtained by removing "F4-1" being the process ID of the function to be moved from the Flow ID 132-1 from "102" (intra-server target Flow ID=102) from the process list 133-1 as Flow of "201" as the new ID obtained by rewriting in step S1062 (step S1063).

FIG. 4B includes an example of the Flow definition table 13-2 after partial rewriting has been performed. An entry with Flow ID 132-2 being "201" is added, and the process ID corresponding to "F4-1" is removed and "F5-2" with "F5-1" set as a new ID remains in the process list 133-2 of the added entry. In addition, "Sere" which is the same as in the case of the intra-server target Flow ID=102 is set in the allocation position 131-2.

Subsequently, on the intra-gateway routing table 14-1, the function allocation unit 102 obtains "401" of the Flow ID 143-1 of the entry including "B22" of the target sensor ID obtained in step S1062 in the sensor ID 142-1 as an intra-gateway target Flow ID, and rewrites "401" of the intra-gateway target Flow ID to "402" as the new ID (step S1064).

FIG. 5B includes an example of the intra-gateway routing table 14-2 after partial rewriting has been performed. The Flow ID 143-2 in the entry having sensor ID 142-2 of "B22" is rewritten to "402".

Next, on the Flow definition table 13-1, the function allocation unit 102 sets the Flow to which "F4-2" being a new process ID of a function to be moved from the server 10 has been added to the end of the process list 133-1 of the entry having Flow ID 132-1 being "401" (intra-gateway target Flow ID=401), as a Flow of "402" as the new ID obtained by rewriting in step S1064 (step S1065).

FIG. 4B includes an example of the Flow definition table 13-2 after partial rewriting has been performed. An entry having Flow ID 132-2 being "402" is added. "F1-4" with "F1-2" defined as a new ID remains while "F4-2" has been added, in the process list 133-2 of the added entry. In addition, "G2" which is the same as in the case of the intra-gateway target Flow ID=401 is set in the allocation position 131-2.

The above is an example of each of tables when the function (F4) is moved from the server 10 to the gateway 20-2. Next, an example of each of tables when the function (F4) is further moved from the server 10 to the gateway 20-3 will be described.

Initially, the function allocation unit 102 sets the intra-server target Flow ID=102 as in the above-described step S1061, and searches for an entry including "G3" (movement destination gateway ID=G3) in place of the above-described "G2" in step S1062, and then obtains "B32" of the found entry as the target sensor ID. The rewriting of the intra-server target Flow ID in the found entry to a new ID will be described in the following.

Next, the function allocation unit 102 sets the Flow from which the "F4-1" has been removed from the process list 133-2, as the Flow of the new ID. However, setting of the Flow as Flow of ID being "201" has been already performed in step S1063 described above, this setting is not performed in step S1063 here. Additionally, the rewriting to the new ID in step S1062 here also uses "201".

Subsequently, the function allocation unit 102 sets "B32" as the target sensor ID instead of "B22" in the above-described step S1063, obtains "501" as the intra-gateway target Flow ID, and rewrites "501" to a new ID "502".

Subsequently, similarly to the previously described step S1063, the Flow in which "F4-3" being a new process ID of the function to be moved is added to the end of the process list 133-1 of the entry with the Flow ID 132-2 being "501" is set as Flow of "502" as the new ID.

In an example of the Flow definition table 13-2 after final rewrite illustrated in FIG. 4B, entries having Flow ID 132-2 being "201", "402", and "502" have been added. Moreover, in an example of the intra-gateway routing table 14-2 after final rewrite illustrated in FIG. 5B, rewrite has been made in "402" and "502" as Flow ID 143-2. Moreover, in an example of the intra-server routing table 15-2 after final rewrite illustrated in FIG. 6B, rewrite has been made in "201" as Flow ID 153-2.

Along with the function movement, the function allocation unit 102 updates the gateway function allocation information table 12-1 illustrated in FIG. 3A. Specifically, as in the gateway function allocation information table 12-2 illustrated in FIG. 3B, "F4" is added to the allocation function ID list 122-2 of individual entries of "G2" and "G3" of the gateway ID 121-2.

Furthermore, the function allocation unit 102 also updates the process management table 18-1 illustrated in FIG. 9A. Specifically, as illustrated in the process management table 18-2 in FIG. 9B, an entry with process ID 181-2 being "F5-2" is added.

In addition, the CPU load of the server 10, the gateway 20-2, and the gateway 20-3 changes together with the function movement. For example, the gateway CPU information table 16-1 illustrated in FIG. 7A changes to the gateway CPU information table 16-2 illustrated in FIG. 7B, in which values of CPU loads 162-2 of entries of "G2" and "G3" in the gateway ID 161-2 increases.

In contrast, the server CPU information table 17-1 illustrated in FIG. 8A changes to the server CPU information table 17-2 illustrated in FIG. 8B, in which a value of the CPU load 171-2 decreases with reduced load of the server 10 and with the normalized CPU load as the data processing system 1.

As a breakdown of the CPU load of each of processes of the server 10, the process management table 18-1 illustrated in FIG. 8A changes to the process management table 18-2 illustrated in FIG. 8B. There is a decrease in a value of CPU load 182-2 in the entry having process ID 181-2 being "F4-1" while a value of CPU load 182-1 in the entry having process ID 181-1 being "F5-1" is distributed to values of CPU load 182-2 in the entry of each of the process ID 181-2 being "F5-1" and "F5-2".

An example of allocation of processes reflecting each of the above-described tables with respect to FIG. 1A will be described with reference to FIG. 1B. As illustrated in FIG. 1B, a function (F4) moves to the gateway 20-2, process 61-4 and process 64-2 are added, the function (F4) moves to the gateway 20-3 and process 61-5 and process 64-3 are added.

In addition, a part of the function (F4) is moved from the server 10, and process 65-2 is added to the server 10. While Flow 71 is as described with reference to FIG. 1A, Flow 72 is distributed to Flow 72-1 for sensor data of sensor 30-2 and Flow 72-2 for sensor data of sensor 30-4 and sensor 30-6.

Effect of Present Embodiment

By dynamically changing the execution positions of the data processing function in accordance with the status, it is possible to manage with the existing computational resource amount without additional computation resources in the server or the gateway, making it possible to suppress the cost for data processing calculation resources.

The present invention is not limited to the above-described exemplary embodiments, but may include various types of modification. For example, the above-described embodiments give detailed description just to allow the present invention to be clearly understood. Therefore, the present invention is not limited to the case having all of components in the configuration.

Moreover, the above configurations, functions, processing units, processing means, or the like, may be implemented by hardware by designing a portion or all with an integrated circuit, for example. Moreover, each of the above-described configurations, functions, or the like, may be implemented with software by a processor by interpreting and executing a program designed to implement individual functions.

Information such as programs, tables, files used to implement each of functions can be located in a recording device such as memory, a hard disk, a solid state drive (SSD), or a recording medium such as a flash memory card or an optical disk.

Note that control lines and information lines are illustrated to represent what is considered to be necessary for description, and thus, not necessarily represent all control lines and information lines involved with the product. In practice, substantially all of the configurations may be connected to each other.

REFERENCE SIGNS LIST 1 data processing system
10 server
20 gateway
30 sensor
101 intra-server distribution unit
102 function allocation unit
201 intra-gateway distribution unit

The invention claimed is:

1. A data processing system which links a plurality of types of processing each of which configured to implement a function, the data processing system comprising:
a gateway for inputting data; and
a server for inputting data output from the gateway, wherein the gateway
applies first processing including one or more types of processing to the input data in accordance with information included in first flow information and outputs the processed data to the server, and
the server
applies second processing to the data input from the gateway in accordance with the information included in the first flow information and thereafter applies third processing including one or more types of processing,
specifies the second processing, generates, from the first flow information, second flow information including information for applying the third processing to the data input by the server from the gateway, and
generates, from the first flow information, the second flow information including information for applying the first processing to the data input by the gateway and thereafter applying the second processing,
wherein the gateway
inputs data from a plurality of sensors to which sensor identifiers are individually assigned,
the server includes:
a flow definition table storing information associating an intra-gateway flow identifier (ID) with an ID of the first processing and storing information associating an intra-server flow ID, an ID of the second processing and an ID of the third processing having been ordered with each other as the first flow information;
an intra-gateway routing table associating the sensor ID with the intra-gateway flow ID; and
an intra-server routing table associating the sensor ID with the intra-server flow ID, and
the server
uses the flow definition tables to specify the intra-server flow ID from among the ID of the second processing,
uses the intra-server routing table to specify the sensor ID from among the specified intra-server flow ID to update the intra-server flow ID,
uses the flow definition table to associate the updated intra-server flow ID with the ID of the third processing so as to generate the second flow information including information of applying the third processing to the data input by the server from the gateway,
uses the intra-gateway routing table to specify an intra-gateway flow ID from the specified sensor ID, and
uses the flow definition table to associate the new intra-gateway ID with the ordered ID of the first processing and the ID of the second processing with each other, and thereby allowing the gateway to apply the first processing to the input data and thereafter generate the second flow information including information of applying the second processing.

2. The data processing system according to claim 1, wherein the gateway
inputs data from each of a first sensor and a second sensor, the first flow information
includes information for
applying the second processing to the data input from the first sensor via the gateway, thereafter applying the third processing including one or more types of processing, applying fourth processing to data input from the second sensor via the gateway, and thereafter applying fifth processing including one or more types of processing, and
the server
specifies the fourth processing,
determines whether the fourth processing is applicable on the gateway, and when it is determined that the fourth processing is not applicable, the server specifies the second processing, and
determines whether the second processing is applicable in the gateway, and when it is determined that the second processing is applicable, the server generates the second flow information.

3. The data processing system according to claim 2, wherein the server
includes a management table storing information of whether each of the second processing and the fourth processing is applicable, in the gateway, and
determines, by using the management table, whether the fourth processing is applicable and determines whether the second processing is applicable.

4. The data processing system according to claim 3, wherein the server
calculates a load of the fourth processing in the gateway in a case where the server has determined in the determination using the management table that the fourth processing is applicable, determines whether the calculated load is less than a preset threshold, and determines that the fourth processing is not applicable when it is determined that the load is not less than the threshold, and calculates a load of the second processing in the gateway in a case where the server has determined in the determination using the management table that the second processing is applicable, determines whether the calculated load is less than a preset threshold, and determines that the second processing is applicable when it is determined that the load is less than the threshold.

5. The data processing system according to claim 4, wherein the gateway notifies information regarding the load in the gateway to the server, and the server calculates the load of the fourth processing in the server with respect to data input from the gateway, calculates the load of the fourth processing in the gateway on the basis of a performance ratio of the gateway to the server, calculates the load of the second processing in the server with respect to data input from the gateway and calculates the load of the second processing in the gateway on the basis of the performance ratio of the gateway to the server.

6. A data processing system which links a plurality of types of processing each of which is configured to implement a function, the data processing system comprising:

a gateway for inputting data; and a server for inputting data output from the gateway, wherein the gateway applies first processing including one or more types of processing to the input data in accordance with information included in first flow information and outputs the processed data to the server, and the server applies second processing to the data input from the gateway in accordance with the information included in the first flow information and thereafter applies third processing including one or more types of processing, specifies the second processing, generates, from the first flow information, second flow information including information for applying the third processing to the data input by the server from the gateway, and generates, from the first flow information, the second flow information including information for applying the first processing to the data input by the gateway and thereafter applying the second processing, wherein the server includes:

a flow definition table storing the first flow information including information associating an intra-gateway flow identifier (ID) with an ID of the first processing and storing the first flow information including information associating an intra-server flow ID, an ID of the second processing and an ID of the third processing having been ordered with each other;

an intra-gateway routing table associating the sensor ID with the intra-gateway flow ID;

an intra-server routing table associating the sensor ID with the intra-server flow ID, and an intra-server distribution unit that uses the flow definition table and the intra-server routing table as a basis and applies the second processing and thereafter distributes the data input from the gateway to a flow that applies the third processing including one or more types of processing, and the gateway inputs data from a plurality of sensors to each of which a sensor ID is assigned, obtains the flow definition table and the intra-gateway routing table from the server, and includes an intra-gateway distribution unit that uses the obtained flow definition table and the intra-gateway routing table as a basis and distributes the data input from the sensor to a flow that applies the first processing.

7. A method of controlling a data processing system which links a plurality of types of processing each of which configured to implement a function, wherein the data processing system including:

a gateway for inputting data; and a server for inputting data output from the gateway, first flow information includes information for applying first processing including one or more types of processing to the data input on the gateway, applying second processing to the data input on the server from the gateway and thereafter applying third processing including one or more types of processing, and the server specifies the second processing;

generates, from the first flow information, second flow information including information for applying the third processing to the data input by the server from the gateway, and generates, from the first flow information, the second flow information including information for applying the first processing to the data input by the gateway and thereafter applying the second processing, wherein the gateway inputs data from a plurality of sensors to which sensor identifiers are individually assigned, the server includes:

a flow definition table storing information associating an intra-gateway flow identifier (ID) with an ID of the first processing and storing information associating an intra-server flow ID, an ID of the second processing and an ID of the third processing having been ordered with each other as the first flow information;

an intra-gateway routing table associating the sensor ID with the intra-gateway flow ID; and an intra-server routing table associating the sensor ID with the intra-server flow ID, and the server uses the flow definition tables to specify the intra-server flow ID from among the ID of the second processing, uses the intra-server routing table to specify the sensor ID from among the specified intra-server flow ID to update the intra-server flow ID, uses the flow definition table to associate the updated intra-server flow ID with the ID of the third processing so as to generate the second flow information including information of applying the third processing to the data input by the server from the gateway, uses the intra-gateway routing table to specify an intra-gateway flow ID from the specified sensor ID, and uses the flow definition table to associate the new intra-gateway ID with the ordered ID of the first processing and the ID of the second processing with each other, and thereby allowing the gateway to apply the first processing to the input data and thereafter generate the second flow information including information of applying the second processing.

8. The method of controlling the data processing system, according to claim 7,
wherein the gateway
inputs data from each of a first sensor and a second sensor, the first flow information includes information for
applying the second processing to the data input from the first sensor via the gateway, thereafter applying the third processing including one or more types of processing, applying fourth processing to data input from the second sensor via the gateway, and thereafter applying fifth processing including one or more types of processing, and
the server
specifies the fourth processing,
determines whether the fourth processing is applicable on the gateway, and when it is determined that the fourth processing is not applicable, the server specifies the second processing, and
determines whether the second processing is applicable in the gateway, and when it is determined that the second processing is applicable, the server generates the second flow information.

\* \* \* \* \*